United States Patent [19]

Jensen

[11] 4,024,336

[45] May 17, 1977

[54] SPLIT BUSHING CONTROL
[75] Inventor: Thomas H. Jensen, Murrysville, Pa.
[73] Assignee: PPG Industries, Inc., Pittsburgh, Pa.
[22] Filed: Nov. 28, 1975
[21] Appl. No.: 636,003
[52] U.S. Cl. .................................... 13/6; 65/162; 219/494
[51] Int. Cl.² ........................................ C03B 5/02
[58] Field of Search .................... 13/6, 23, 25; 65/DIG. 4, 162, 160, 12; 219/494, 501, 482, 497, 499

[56] References Cited
UNITED STATES PATENTS

| 3,556,753 | 1/1971 | Glaser | 13/6 X |
| 3,912,477 | 10/1975 | Brady et al. | 13/6 X |

Primary Examiner—R. N. Envall, Jr.
Attorney, Agent, or Firm—Alan T. McDonald; John E. Curley

[57] ABSTRACT

A circuit is described for controlling the temperature of a heating element used to heat molten glass in a bushing from which the molten glass is drawn into glass fibers and in which the bushing is divided into two sections. The circuit includes two temperature sensitive elements, such as thermocouples, each of which is connected to a temperature controller. In one embodiment of the invention, the first temperature controller regulates the power supplied by the transformer while the second temperature controller regulates the current to the heating element through a pair of full wave variable impedance devices. In the second embodiment, the transformer maintains a steady level of voltage supply while each temperature controller individually regulates one of two full wave variable impedance devices to regulate the current supplied to each section of the heating element.

8 Claims, 2 Drawing Figures

SPLIT BUSHING CONTROL

BACKGROUND OF THE INVENTION

In the formation of glass fibers, molten glass is pulled from a bushing through orifices or bushing tips located on the bottom of the bushing. Originally, the number of bushing tips did not normally exceed 200. However, as the need for glass fibers has increased, bushings have increased in size and now contain 800 to 2,000 bushing tips, or even more. This has led to the use of split bushings which may, for example, contain two sides each side containing up to 1,000 bushing tips, for a total of 2,000 tips. In order to keep the glass molten prior to passing through the bushing tips, it is imperative that the bushing be heated. Temperature control is vital, since the ability to form glass filaments is directly dependent upon the viscosity of the glass which is in turn directly dependent upon the temperature of the glass. With the advent of the split bushing, the problem arose as to how to control the temperature of each side of the bushing individually without the costly necessity of two separate power systems. The present invention provides such a circuit.

U.S. Pat. No. 3,308,270 issued to the inventor of the present invention and assigned to the assignee of the present invention discloses a circuit for controlling the temperature of two separate bushings using one main power transformer. However, some of the problems of the system include the necessity for keeping a bias current within the system, the requirement for a manual setting of the wiper arm, and the need for two secondary transformers within the system.

U.S. Pat. No. 3,803,385 does supply two or more heaters from one main power supply. However, the only temperature control is to turn power on or off completely to a given heater.

U.S. Pat. No. 3,291,969 supplies current to various sections of a single heating element, but uses a plurality of power supplies.

The present invention has eliminated many of the problems associated with the prior art systems and has through the use of solid state circuitry provided a simpler system for controlling two or more heating elements from a single power supply.

SUMMARY OF THE INVENTION

Briefly, the system of the present invention comprises the utilization of two temperature controllers and two full wave variable impedance devices to regulate the current transmitted from a power transformer to two sections of a heating element such as a bushing.

DETAILED DESCRIPTION OF THE DRAWINGS

Figure 1:
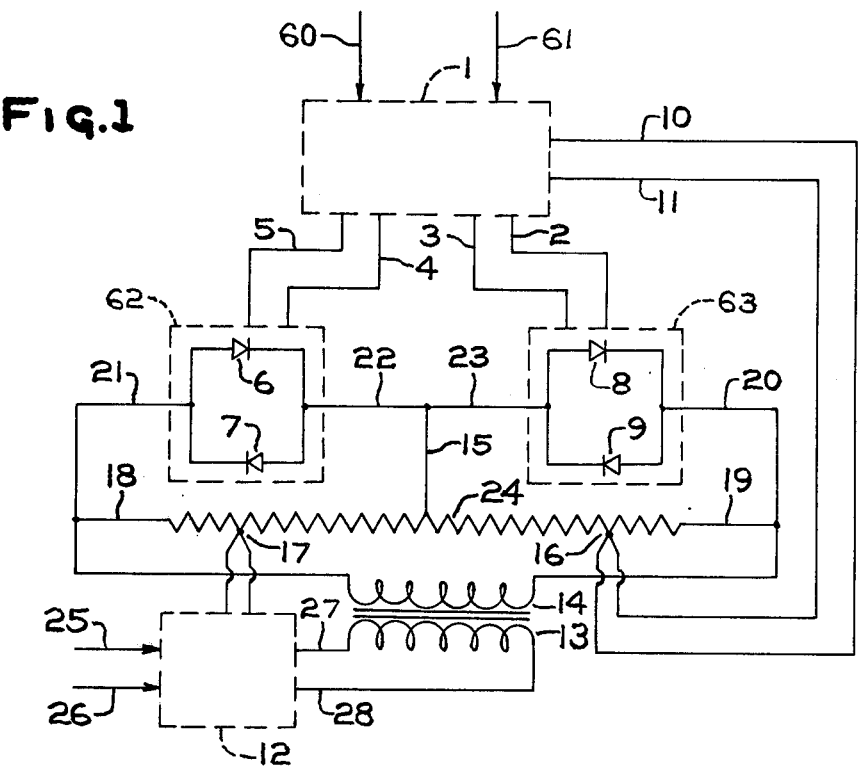
FIG. 1 is a diagrammatic illustration of the first embodiment of the present invention. In this embodiment a first termperature controller regulates the power supplied by the power transformer while a second temperature controller regulates the current through a pair of full wave variable impedance devices to both sides of the heating element.

Referring now to FIG. 1, a power transformer is shown having a primary coil or winding 13 and a secondary coil or winding 14 connected in parallel to a first part 18 and a second part 19 of a heating element 24. This heating element could be any element in which individual temperature control of its two sides is desirable but is in practice the two sides of a split glass fiber forming bushing. On the first side 18 of the heating element or bushing 24 there is connected a temperature sensitive element 17, such as a thermocouple, which relays temperature information from this side of the heating element 24 to a first temperature controller 12 which is receiving its operating current through electrical leads 25 and 26. This temperature controller 12 has previously been adjusted to a predetermined set point temperature for the first side 18 of the bushing or heating element 24. Dependent on the temperature information received, the controller regulates the power supply to the primary winding of the power transformer 13. This in turn regulates the total power available for the heating element 24 through the secondary winding 14 of the power transformer.

On the other side 19 of the heating element 24 there is connected a second temperature sensitive element 16 which may also be a thermocouple. This element is connected through lines 10 and 11 to a second temperature controller 1. This controller receives its operating power through lines 60 and 61. This controller has also been preset to a given temperature for the second half of the heating element 24. Upon receiving the temperature information, temperature controller 1 increases or decreases the current allowed to flow through each of two full wave variable impedance devices 62 and 63. Full wave variable impedance device 62 contains two half wave variable impedance devices such as thyristors 6 and 7. Likewise, full wave variable impedance device 63 contains two thyristors 8 and 9. The thyristors 6 and 7 or 8 and 9 are internally connected in parallel. The devices 62 and 63 are connected in parallel with the heating element 24 through lines 20 and 21 and in series with each other through lines 22 and 23 and through a null point line 15 to a null point between the two sides of the heating element 24. The second temperature controller renders either device 62 and 63 to be conductive in such an amount as is necessary to bypass sufficient current around the side needing less current to maintain desired temperature.

In practice, for example, if side 19 required 100 more amps than side 18 to maintain its set point, the second controller 1 would render the variable impedance device 63 non-conductive while providing a control signal to device 62 to permit a 100 amp current to flow around side 18. Obviously, the second controller would be such that its control signals would provide continuous control over the full range of fully conducting on 62 and no conduction on 63 to fully conducting on 63 and no conduction on 62. In the case of thyristors this would be a continuously variable gating signal.

In a typical operation of this embodiment current flow to two sides of a 2/G75 bushing, each side producing 400 glass filaments, can be maintained using as the control full wave impedance devices two pairs of thyristors connected in parallel as in FIG. 1. These thyristors may be, for example, Westinghouse Type 282 Pow-R-Disc ™ thyristors. These thyristors are rated at forward current 850 amps RMS, average forward current 550 amps, and can be selected having forward blocking voltages of from 100 to 1400 volts.

In addition to the basic bypass loop there may be installed additional resistors for sensitivity or to provide a maximum limit to allowable current flow. Also, additional features may be built into the controller to provide required sensitivity near the null point.

Figure 2:
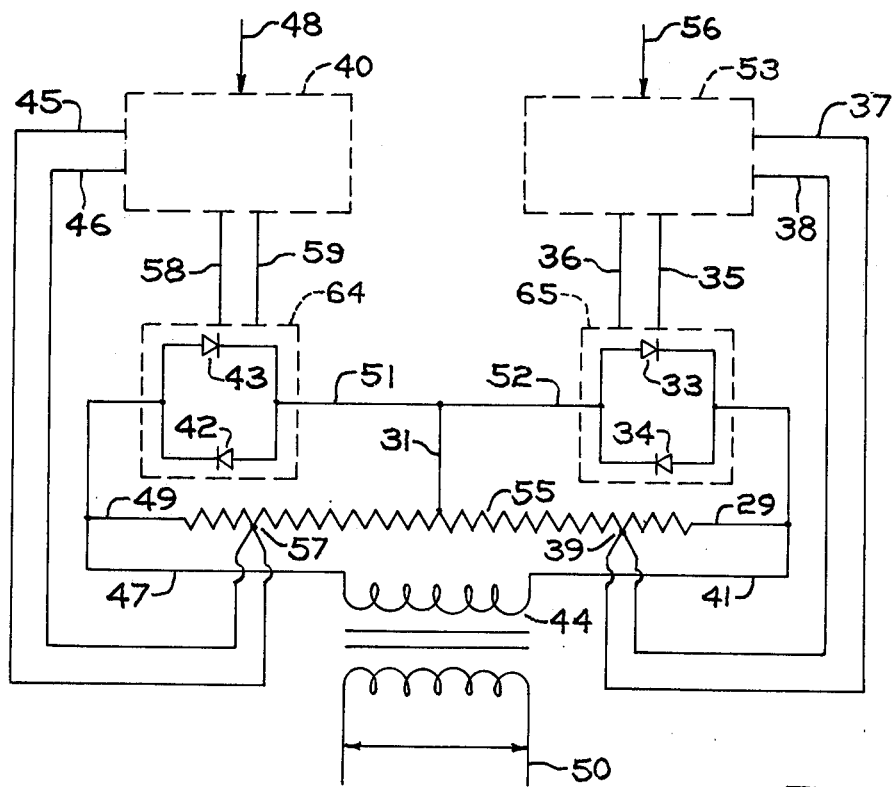
FIG. 2 is a diagrammatic illustration of the second embodiment of the invention wherein each full wave variable impedance device is connected to one part of the heating element and each is regulated by a separate temperature controller to supply current to each part of the heating element. The power transformer operates at a set voltage level.

Referring now to FIG. 2, a second embodiment of the present invention is illustrated. In this embodiment, a transformer having a primary coil or winding 50 and a secondary coil or winding 44 is electrically connected in parallel with a first part 49 and a second part 29 of a heating element 55, such as a bushing. The transformer operates at a constant, pre-set voltage level. The first side 49 of the heating element has connected thereto a temperature sensitive element 57, such as a thermocouple, which relays a temperature signal through lines 45 and 46 to a first temperature controller 40. This controller receives internal power from line 48. Upon receiving the temperature information, the temperature controller, which has been preset to a determined temperature for the first part of the heating element, sends a signal through lines 58 and 59 to a full wave variable impedance device 64 which may be identical to previously mentioned devices 62 and 63, to either increase or decrease the current allowed to flow through the first side 49 of the heating element 55.

Likewise, the second side of the heating element 29 has connected thereto a temperature sensitive element 39 such as a thermocouple. This element sends temperature information through lines 37 and 38 to a second temperature controller 53, which has been preset at a desired temperature for the second part of the heating element 29. This controller received its internal power from line 56. This controller upon receiving the temperature information sends a signal through lines 35 and 36 to a second full wave variable impedance device 65 similar to the device 64 which regulates the current allowed to pass through the second half of the heating element 29. The two full wave variable impedance devices 64 and 65 are connected in parallel with the heating elment 55 and in series with each other through lines 51 and 52, and are further connected to a null point between the two sides of the heating element 55 through line 31. In this embodiment, each temperature controller 40 and 53 is able to control its corresponding full wave variable impedance 64 or 65 from fully conducting to non-conductive. This embodiment allows each controller to separately regulate the temperature of its side of the heating element independently from the regulation of the other side.

While the foregoing description of the invention has been made with reference to specific embodiments, it is not intended that the invention be limited except insofar as in the appended claims.

What is claimed is:

1. Apparatus for maintaining a first part and a second part of an electrical heating element at predetermined temperatures, said parts being energized from the secondary winding of a power transformer having a primary winding and a secondary winding, comprising first circuit means including a first temperature controller and a first temperature sensitive element, constructed and arranged to regulate said power transformer in response to temperature signals from said first temperature sensitive element, said power transformer secondary winding being electrically connected in parallel with said heating element, circuit means including a second temperature controller, a second temperature sensitive element, and a first and a second full wave variable impedance device, said circuit means being arranged to permit current to flow through said first full wave variable impedance device and said second full wave variable impedance device in response to temperature signals from said second temperature sensitive element, such that sufficient current is supplied to said second part of said heating element to maintain a predetermined temperature therein, circuit means to connect said first full wave variable impedance device and said second full wave variable impedance device to a null point between said first part and said second part of said heating element, said first temperature controller and said second temperature controller, each being set at a predetermined temperature.

2. The apparatus of claim 1 wherein said first and said second full wave variable impedances comprise two half wave variable impedance devices.

3. The apparatus of claim 2 wherein said half wave variable impedance devices are thyristors.

4. The apparatus of claim 1 wherein said heating element is a bushing for drawing molten glass to fibers.

5. Apparatus for maintaining a first part and a second part of an electrical heating element at predetermeind temperatures, said parts being energized from the secondary winding of a power transformer having a primary winding and a secondary winding, comprising first circuit means including a first temperature controller, a first temperature sensitive element, and a first full wave variable impedance device, arranged to permit current to flow through said first full wave variable impedance device such that sufficient current is supplied to said first part of said heating element to maintain a predetermined temperature therein, second circuit means including a second temperature controller, a second temperature sensitive element, and a second full wave variable impedance device, arranged to permit current to flow through said second full wave variable impedance device such that sufficient current is supplied to said second part of said heating element to maintain a predetermined temperature therein, said power transformer being electrically connected in parallel with said heating element, circuit means to connect said first and said second full wave variable impedance devices at a null point between said first part and said second part of said heating element, said first and said second temperature controllers each being set at a predetermined temperature.

6. The apparatus of claim 5 wherein said first and said second full wave variable impedance devices comprise two half wave variable impedance devices.

7. The apparatus of claim 6 wherein said half wave variable impedance devices are thyristors.

8. The apparatus of claim 5 wherein said heating element is a bushing for drawing molten glass into fibers.

* * * * *